(12) United States Patent
Huang et al.

(10) Patent No.: US 11,770,734 B2
(45) Date of Patent: Sep. 26, 2023

(54) METHOD AND SYSTEM FOR EDGE NETWORK EXPOSURE FUNCTION WITH MEC NETWORK

(71) Applicant: Verizon Patent and Licensing Inc., Arlington, VA (US)

(72) Inventors: Ye Huang, San Ramon, CA (US); Gerardo S. Libunao, Manalapan, NJ (US); Sagiv Draznin, Walnut Creek, CA (US); Miguel A. Carames, Long Valley, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 144 days.

(21) Appl. No.: 16/774,046

(22) Filed: Jan. 28, 2020

(65) Prior Publication Data
US 2021/0235316 A1    Jul. 29, 2021

(51) Int. Cl.
*H04W 28/02* (2009.01)
*H04W 48/16* (2009.01)

(52) U.S. Cl.
CPC ....... *H04W 28/0289* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2018/0049179 A1* | 2/2018 | Shah | H04W 4/38 |
| 2018/0192390 A1* | 7/2018 | Li | H04W 60/04 |
| 2018/0270780 A1* | 9/2018 | Xiong | H04W 60/04 |
| 2019/0014525 A1* | 1/2019 | Jin | H04W 8/22 |
| 2019/0223250 A1* | 7/2019 | Dao | H04W 76/20 |
| 2019/0261260 A1* | 8/2019 | Dao | H04W 36/0033 |
| 2020/0196375 A1* | 6/2020 | Ryu | H04W 76/34 |
| 2020/0296653 A1* | 9/2020 | Huang | H04W 40/00 |
| 2020/0404069 A1* | 12/2020 | Li | H04W 8/24 |
| 2021/0029087 A1* | 1/2021 | Uy | H04L 43/062 |
| 2021/0058748 A1* | 2/2021 | Liao | H04W 76/11 |
| 2022/0321455 A1* | 10/2022 | Xiao | H04L 45/24 |

OTHER PUBLICATIONS

Sami Kekki et al., "MEC in 5G networks", ETSI White Paper No. 28, Jun. 2018, all pages (Year: 2018).*

* cited by examiner

*Primary Examiner* — Srinivasa R Reddivalam

(57) ABSTRACT

A method, a device, and a non-transitory storage medium are described in which a edge network exposure function service is provided. An edge network exposure function device may provide the edge network exposure function service. The edge network exposure function service may communicate with a radio access network, a mobile edge computing network, and a main edge network exposure function device to provide radio access network, end device, and control information. The edge network exposure function device may also facilitate handovers of an end device between mobile edge computing networks. The edge network exposure function device may be situated at the network edge and the main network exposure function device may be situated in a core network.

20 Claims, 15 Drawing Sheets

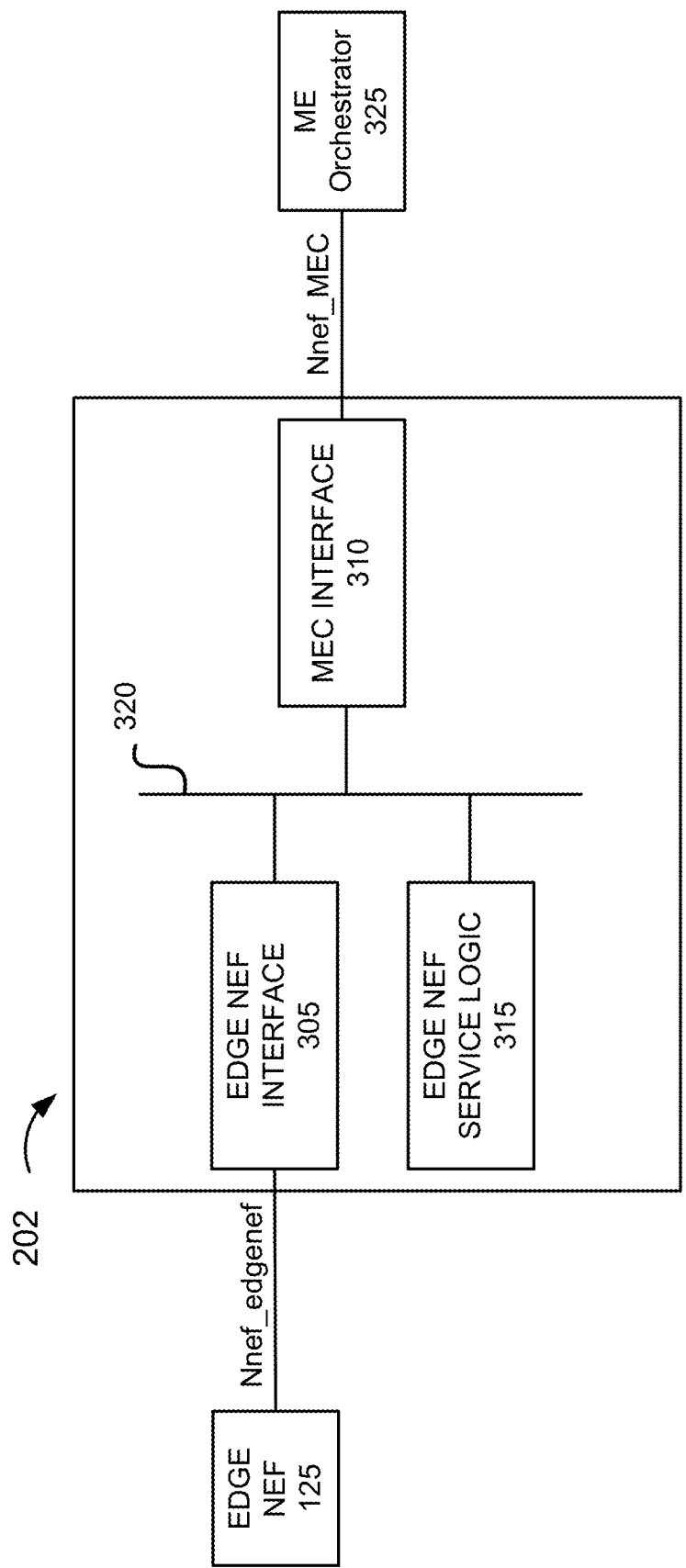

METHOD AND SYSTEM FOR EDGE NETWORK EXPOSURE FUNCTION WITH MEC NETWORK

BACKGROUND

Development and design of networks present certain challenges from a network-side perspective and an end device perspective. In order to enhance performance, multi-access edge computing (MEC) (also known as mobile edge computing (MEC)) is being explored in which core network capabilities (e.g., computational, storage, communication links, etc.) are situated at the network edge in order to reduce traffic being sent to the core network and reduce latency amongst other things.

BRIEF DESCRIPTION OF THE DRAWINGS

FIG. 3A is a diagram illustrating exemplary components of a main edge network exposure function that provides an exemplary embodiment of the edge network exposure function service;

DETAILED DESCRIPTION OF PREFERRED EMBODIMENTS

Figure 1:
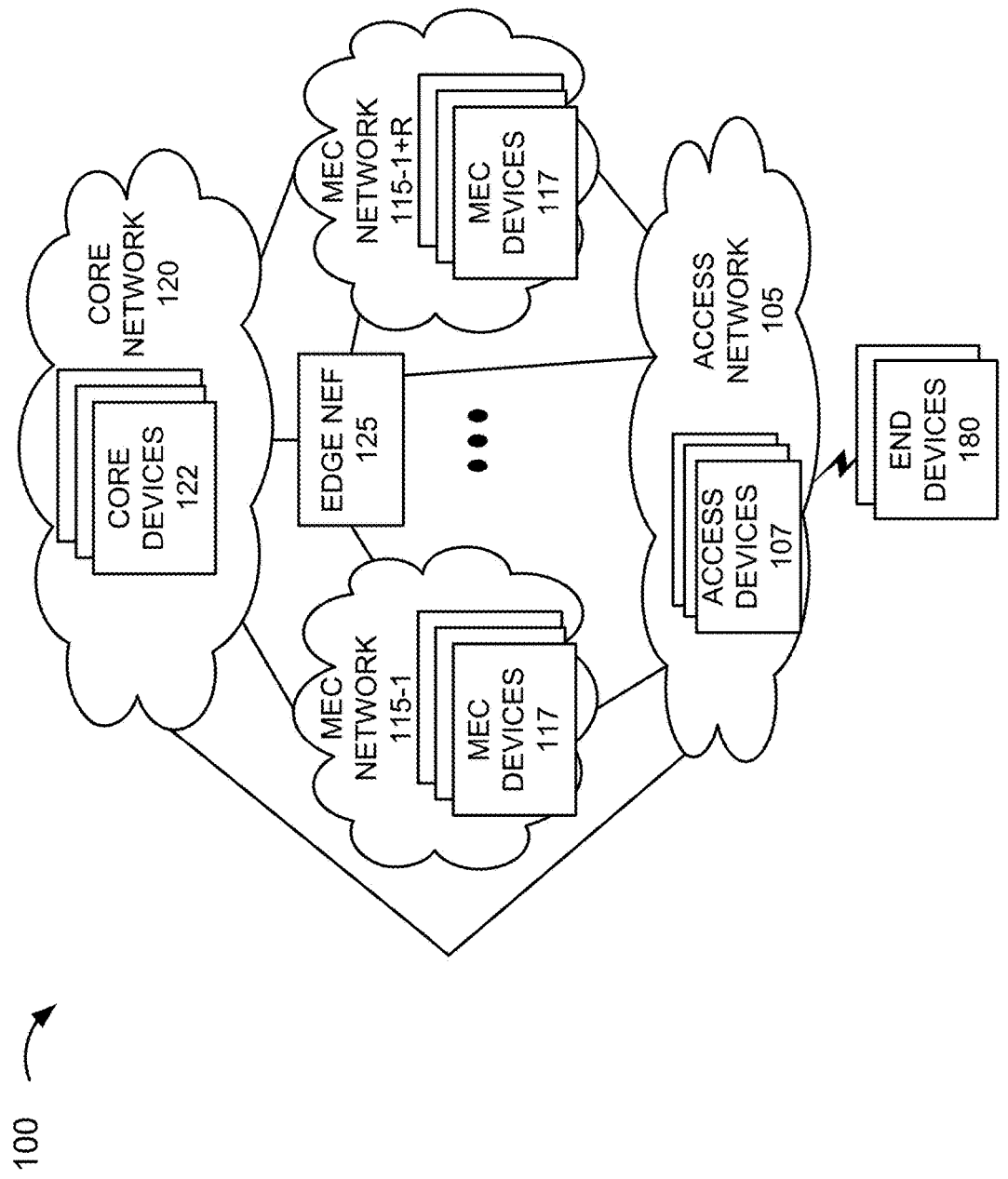
FIG. 1 is a diagram illustrating an exemplary environment in which an exemplary embodiment of an edge network exposure function service may be implemented.

The following detailed description refers to the accompanying drawings. The same reference numbers in different drawings may identify the same or similar elements. Also, the following detailed description does not limit the invention.

MEC networks or other types of end device application or service layer networks (also referred to as "application service layer network") provide an application and/or a service (also referred to as an "application service"). The application service may include a monolithic application, a microservice, or another type of configurable architecture of an application service. However, the architecture for MEC networks may operate as a closed environment and may not provide any orchestration among different MEC platforms or among MEC platforms and a macro network. This may be problematic when considering the interoperability between a multi-vendor environment and the MEC architecture. From a core network perspective, a Network Exposure Function (NEF) device (or other network device of the core network) may introduce latency in relation to the lifecycle and/or control of an application service of a MEC network.

There may be other limitations related to a MEC network. For example, a host in the MEC network, which may provide an application service, may be controlled by an entity of the MEC network and not by an entity associated with the application service. Also, an entity's network information (e.g., radio access network (RAN) information, operator's network internal information, network security information, etc.) may be exposed to the MEC network (e.g., from a RAN device) and may create various security and/or privacy risks or issues for the entity and/or their users. Further, the MEC network may offer limited MEC Application Programming Information (API) support. Additionally, the MEC network may require information from the rest of the network, e.g., when MEC customers move outside of the MEC footprint, which requires coordination and information exchange between network devices in the macro network and in the MEC network.

According to exemplary embodiments, an edge network exposure function (NEF) service is described. According to an exemplary embodiment, the edge network exposure function service includes network exposure functions, which may be situated at edge locations associated with MEC networks. For the sake of description and reference, these network exposure functions may be referred to as "edge network exposure functions."

According to an exemplary embodiment, the edge network exposure function service may also include a network exposure function that orchestrates the edge network exposure functions. For example, the network exposure function may operate as a centralized or controller-based network exposure function. The network exposure function may be situated in a core network. For the sake of description and reference, the network exposure function may be referred to as "main network exposure function."

According to an exemplary embodiment, the edge network exposure function may provide an edge network exposure function service. For example, the edge network exposure function may include an interface for a radio access network and an interface for a MEC network. The edge network exposure function may include logic that provides communication (e.g., the exchange of messages) between the radio access network and the MEC network. For example, the communication may include and/or pertain to RAN information (e.g., signal level, Quality of Service (QoS), radio frequency, signal level, etc.), MEC platform enablement, MEC application service management, bandwidth control, user equipment (UE) information, and UE Quality of Experience (QoE). The edge network exposure function may include an API in support of communication and the edge network exposure function service.

According to an exemplary embodiment, the edge network exposure function may also include an interface that provides communication with one or multiple other edge network exposure functions. For example, the communication may include and/or pertain to UE location information, UE context information, and a handover procedure between MEC networks.

According to an exemplary embodiment, the edge network exposure function may include an interface that provides communication with the main network exposure function. For example, the communication may include and/or pertain to control services (e.g., traffic steering, QoS control, etc.), notification services (e.g., UE location changes, mobility, etc.), and platform and administrative services (e.g., add, delete, update an application service, etc.), as described herein.

According to an exemplary embodiment, the edge network exposure function may also include one or multiple other interfaces that provide communication with other network devices of the core network. For example, edge network exposure function may include an interface that provides communication with an Access and Mobility Management Function (AMF). For example, the communication may include and/or pertain to UE location and mobility.

According to an exemplary embodiment, the main network exposure function may include logic that manages and communicates with edge network exposure functions. Main network exposure function may also include logic that exposes services and capabilities and provides other functions in accordance with a standard (e.g., Third Generation Partnership Project (3GPP), International Telecommunication Union (ITU), European Telecommunications Standards Institute (ETSI), GSM Association (GSMA), etc.). The network exposure function may include an API in support of communication and the edge network exposure function service.

Although the edge network exposure function service may be described in relation to MEC networks, according to other exemplary embodiments, other types of application service layer networks may be implemented to include the edge network exposure function service.

In view of the foregoing, the edge network exposure function service may eliminate security and/or privacy vulnerabilities, facilitate handover between MEC networks, facilitate handover from/to MEC and macro networks, reduce latency issues relating to the provisioning and management of an application service, enhance MEC interoperability with a network, handle MEC service outages, and facilitate localized MEC control and operations.

FIG. 1 is a diagram illustrating an exemplary environment 100 in which an exemplary embodiment of the edge network exposure function service may be implemented. As illustrated, environment 100 includes access network 105, MEC network 115-1 through 115-1+R (also referred to collectively as MEC networks 115, and individually or generally as MEC network 115), and a core network 120. Access network 105 includes access devices 107. MEC network 115 includes MEC devices 117. Core network 120 includes core devices 122. Environment 100 further includes an edge network exposure function (NEF) and end devices 180.

The number, type, and arrangement of networks illustrated in environment 100 are exemplary. For example, according to other exemplary embodiments, environment 100 may include an additional and/or different application service layer network that may or may not be subject to the edge network exposure function service. Additionally, or alternatively, other networks not illustrated in FIG. 1 may be included, such as a backhaul/fronthaul network or another type of network (e.g., an external network, etc.), as described herein.

The number, the type, and the arrangement of network devices, and the number of end devices 180 are exemplary. A network device, a network element, or a network function (also referred to as a network device) may be implemented according to one or multiple network architectures, such as a client device, a server device, a peer device, a proxy device, a cloud device, a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.).

Environment 100 includes communication links between the networks, between the network devices, and between end devices 180 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, a service plane, and a network management plane. Environment 100 may include other types of planes of communication. A message communicated in support of the edge network exposure function service may use at least one of these planes of communication. Additionally, an interface of a network device may be modified (e.g., relative to an interface defined by a standard, such as 3GPP, ITU, ETSI, etc.) or a new interface of the network device may be provided in order to support the communication (e.g., transmission and reception of messages, information elements (IE), attribute value pairs (AVPs), etc.) between network devices that support the edge network exposure function service, as described herein. According to various exemplary implementations, the interface of a network device may be a service-based interface or a reference point-based interface.

Access network 105 may include one or multiple networks of one or multiple types and technologies. For example, access network 105 may be implemented to include a Fourth Generation (4G) radio access network (RAN) (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, a next generation RAN (e.g., a Fifth Generation (5G)-access network (5G-AN) or a 5G-RAN (referred to herein as simply a 5G-RAN)), another type of future generation RAN, and/or another type of RAN (e.g., a legacy Third Generation (3G) RAN, etc.). Access network 105 may communicate with other types of access networks, such as, for example, a WiFi network, a Worldwide Interoperability for Microwave Access (WiMAX) network, a local area network (LAN), a Citizens Broadband Radio System (CBRS) network, a cloud RAN, a wired network (e.g., optical, cable, etc.), an optical network, or another type of network that provides access to or can be used as an on-ramp to access network 105, MEC network 115, and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or a NG core (NGC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

According to some exemplary embodiments, access network 105 may be implemented to include various architectures of wireless service, such as, for example, macrocell, microcell, femtocell, picocell, metrocell, new radio (NR) cell, LTE cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 Gigahertz (GHz), above 6 GHz, licensed radio spectrum, unlicensed radio spectrum, etc.), and/or other attributes or technologies used for radio communication.

Depending on the implementation, access network 105 may include one or multiple types of network devices, such as access devices 107. For example, access devices 107 may include an evolved Node B (eNB), a next generation Node B (gNB), an evolved Long Term Evolution (eLTE) eNB, a radio network controller (RNC), a remote radio head (RRH), a baseband unit (BBU), a CU, a DU, a small cell node (e.g., a picocell device, a femtocell device, a microcell device, a home eNB, etc.), a future generation wireless access device, another type of wireless node (e.g., a WiFi device, a WiMax device, a hotspot device, etc.) that provides a wireless access service, or other another type of network device that provides a transport service (e.g., routing and forwarding), such as a router, a switch, or another type of layer 3 (e.g., network layer of the Open Systems Interconnection (OSI) model) network device. Additionally, or alternatively, access devices 107 may include wired and/or optical devices (e.g., modem, wired access point, optical access point, Ethernet device, etc.) that provide network access. According to some exemplary embodiments, access devices 107 may include an edge network exposure function that provides an edge network exposure function service, as described herein.

MEC network 115 includes a platform that provides an application service. As illustrated, MEC network 115 may be located at an edge of a network, such as access network 105. Although not illustrated, MEC network may be co-located with another type of network, such as core network 120 or an external network. Alternatively, MEC network 115 may not be co-located. MEC network 115 may be implemented using one or multiple technologies including, for example, network function virtualization (NFV), containers, SDN, cloud computing, Infrastructure-as-a-Service (IaaS), Platform-as-a-Service (PaaS), Software-as-a-Service (SaaS), or another type of network technology.

Depending on the implementation, MEC network 115 may include various types of network devices that are illustrated in FIG. 1 as MEC devices 117. For example, MEC devices 117 may include virtual network devices (e.g., virtualized network functions (VNFs), servers, hosts, containers, hypervisors, virtual machines, network function virtualization infrastructure (NFVI), and/or other types of virtualization elements, layers, hardware resources, operating systems, engines, etc.) and associated applications services for use by end devices 180. The application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, and/or other types of mobile edge application services.

Additionally, depending on the implementation, MEC devices 117 may include other types of network devices, such as an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, a traffic rules controller, an ME platform, and/or other types of network devices (e.g., routers, core devices 122, an ingress device, a load balancer, etc.), and network resources (e.g., storage devices, communication links, etc.).

Core network 120 may include one or multiple networks of one or multiple network types and technologies. Core network 120 may include a complementary network of access network 105. For example, core network 120 may be implemented to include an Evolved Packet Core (EPC) of an LTE, an LTE-A, an LTE-A Pro, a next generation core (NGC) network, and/or a future generation core network. Core network 120 may include a legacy core network.

Depending on the implementation of core network 120, core network 120 may include various types of network devices that are illustrated in FIG. 1 as core devices 122. For example, core devices 122 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an AMF, an SMF, a unified data management (UDM) device, an authentication server function (AUSF), a network slice selection function (NSSF), a network repository function (NRF), a network exposure function (NEF), a PCF, a network data analytics function (NWDAF), a lifecycle management (LCM) device, and/or an application function (AF). According to other exemplary implementations, core network 120 may include additional, different, and/or fewer network devices than those described. For example, core devices 122 may include a non-standard and/or a proprietary network device, or another type of network device that may be well-known but not particularly mentioned herein.

Edge network exposure function 125 provides an edge network exposure function service, as described herein. Edge network exposure function 125 may include interfaces that provide communication with access network 105, MEC network 115, and core network 120, as described herein. Edge network exposure function 125 is described further herein.

End device 180 includes a device that has computational and communication capabilities (e.g., wireless, wired, optical, etc.). End device 180 may be implemented as a mobile device, a portable device, a stationary device (e.g., a non-mobile device), a device operated by a user, or a device not operated by a user. For example, end device 180 may be implemented as a Mobile Broadband device, a smartphone, a computer, a tablet, a netbook, a phablet, a wearable device (e.g., a watch, glasses, a visor, etc.), a vehicle support system, an Internet of Things (IoT) device, a user device, an autonomous device, a smart device, a drone, customer premise equipment (e.g., a set top box, etc.), a streaming player device, a global positioning device, a game system, a music playing system, or some other type of wireless, wired, and/or optical end device. According to various exemplary embodiments, end device 180 may be configured to execute various types of software (e.g., applications, programs, etc.). The number and the types of software may vary among end devices 180.

End device 180 may support one or multiple RATs (e.g., 4G, 5G, etc.) and various portions of the radio spectrum (e.g., multiple frequency bands, multiple carrier frequencies, licensed, unlicensed, etc.), network slicing, DC service, and/or other types of connectivity services. Additionally, end device 180 may include one or multiple communication interfaces that provide one or multiple (e.g., simultaneous) connections via the same or different RATs, frequency bands, carriers, network slices, and/or other communication medium (e.g., wired, etc.). The multimode capabilities of end device 180 may vary among end devices 180.

Figure 2:
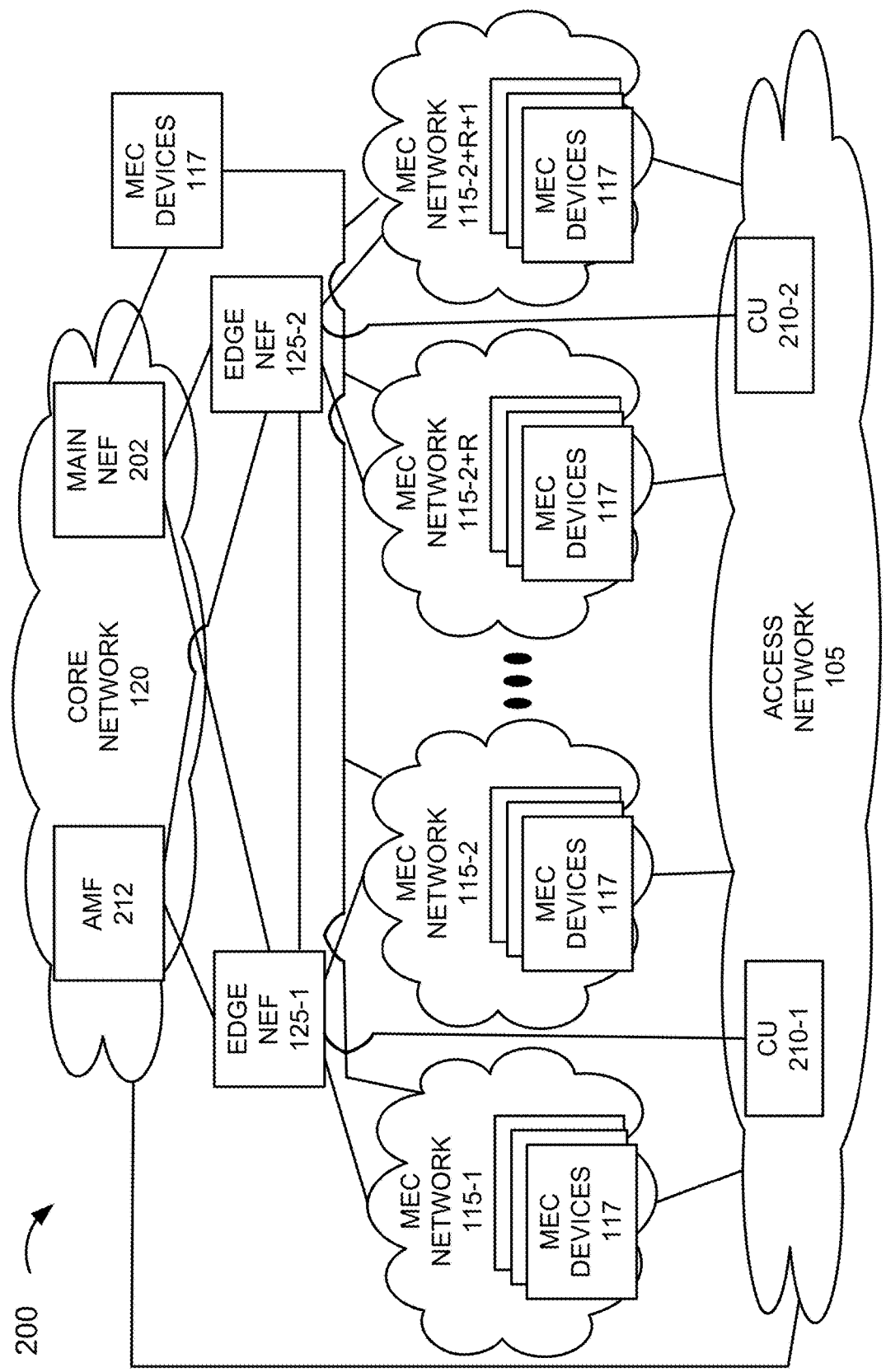
FIG. 2 is a diagram illustrating another exemplary environment in which an exemplary embodiment of the edge network exposure function service may be implemented.

FIG. 2 is a diagram illustrating a portion of an exemplary environment 200 in which an exemplary embodiment of the edge network exposure function service may be implemented. As illustrated, core network 120 includes core devices 122, such as a main network exposure function 202 and an AMF 212. Access network 105 includes access devices 107, such as CU 210-1 and 210-2 (also referred to as CUs 210, and individually or generally as CU 210). Additionally, environment 200 includes edge network exposure functions 125-1 and 125-2 (also referred to collectively as edge network exposure functions 125, and individually or generally as edge network exposure function 125). As illustrated, according to some exemplary embodiments, a single edge network exposure function 125 may provide the network exposure function service to multiple MEC networks 115. According to other exemplary embodiments, a dedicated edge network exposure function 125 may implemented for each MEC network 115.

The number, type, and arrangement of network devices illustrated in environment 200 are exemplary. Additionally, the number, type, and arrangement of communication links illustrated in environment 200 are also exemplary.

According to an exemplary embodiment, edge network exposure function 125 may be communicatively coupled to a main network exposure function 202. Edge network exposure function 125 may also be communicatively coupled to other types of core devices 122, such as AMF 212. Additionally, edge network exposure functions 125 may be communicatively coupled to access devices 107, such as CUs 210. According to other exemplary embodiments, edge network exposure function 125 may be communicatively coupled to a different type of access device 107, such as an eNB, a gNB, an eLTE eNB, a BBU, or another type of access device 107 that may provide RAN information (e.g., a Radio Network Information Service (RNIS)), Wireless Local Area Network Information (e.g., WI Service (WIS)), or other types of wireless network information service.

As further illustrated, edge network exposure function 125 may be communicatively coupled to MEC devices 117. For example, edge network exposure function 125 may be communicatively coupled to an ME management layer device (e.g., a VIM, a VNFM, an ME platform manager) and/or an ME host layer device (e.g., a ME platform, etc.). Additionally, edge network exposure functions 125 may be communicatively coupled to each other, as illustrated.

Main network exposure function 202 may be communicatively coupled to edge network exposure function 125. Additionally, main network exposure function 202 may be communicatively coupled to MEC devices 117. For example, according to an exemplary embodiment, the MEC devices 117 may include an orchestrator (e.g., an ME orchestrator, etc.). The orchestrator may manage and control multiple MEC networks 115, for example. Main edge network exposure function 202 and edge network exposure function 125 are described further below.

FIG. 3A is a diagram illustrating exemplary components of an exemplary embodiment of main network exposure function 202. As illustrated, main network exposure function 202 may include an edge network exposure function interface 305, a MEC interface 310, edge network exposure function service information logic 315, and a link 320. According to other exemplary embodiments, main network exposure function 202 may include additional, fewer, and/or different components that support the edge network exposure function service, as described herein. Multiple components may be combined into a single component. Additionally, or alternatively, a single component may be implemented as multiple components in which a process or a function may be collaboratively performed or multiple processes or functions may be split between them. According to various embodiments, one or more of the components may operate on various planes of an environment. For example, the various planes may include a data plane, a control plane, a management plane, and/or other planes implemented within the environment.

As previously mentioned, main network exposure function 202 may also include interfaces and logic in accordance with a standard (e.g., 3GPP, ITU, etc.) and/or a proprietary nature associated with a network exposure function (e.g., of a 5G or future generation core network). However, for the sake of brevity, such interfaces and logic have been omitted from this description.

Edge network exposure function interface 305 may include an interface that provides communication with edge network exposure function 125 in support of the edge network edge function service. For purposes of description and reference, the interface is illustrated as an Nnef_edgenef interface.

MEC interface 310 may include an interface that provides communication with a MEC device 117, such as an ME orchestrator 325 in support of the edge network exposure function service. For purposes of description and reference, the interface is illustrated as an Nnef_MEC interface.

Figure 3B:
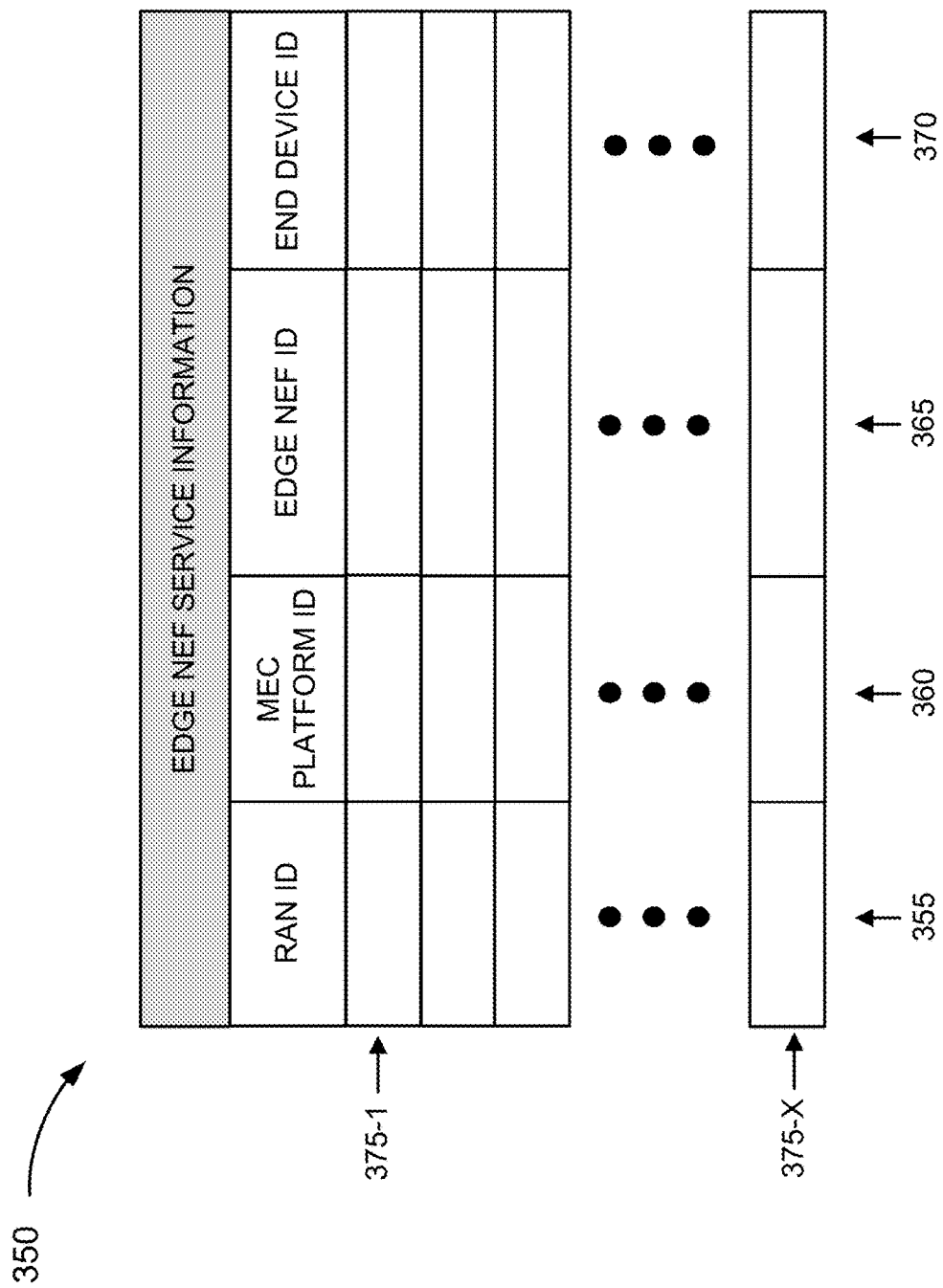
FIG. 3B is a diagram illustrating exemplary edge network exposure function service information.

Edge network exposure function service logic 315 may include logic that provides a MEC-edge network exposure function schema in support of the edge network exposure function service. For example, edge network exposure function service logic 315 may store edge network exposure function service information. FIG. 3B is a diagram illustrating exemplary edge network exposure function service information that may be stored in a table 350. As illustrated, table 350 may include a radio access network identifier field 355, a MEC platform identifier field 360, an edge network exposure function identifier field 365, and an end device identifier field 370. As further illustrated, table 350 includes records 375-1 through 375-X (also referred to as records 375, or individually or generally as record 375) that each includes a grouping of fields 355 through 370 (e.g., correlated information). Edge network exposure function service information is illustrated in tabular form merely for the sake of description. In this regard, edge network exposure function service information may be implemented in a data structure different from a table.

Radio access network identifier field 355 may store an identifier of access device 107 from which RAN information is received by edge network exposure function 125. Radio access network identifier field 355 may store an identifier of access device 107 that provides user plane data associated with an application service session between end device 180 and MEC network 115. For example, in a plane-split architecture, radio access network identifier field 355 may store identifiers of a CU and a DU. According to other examples, in a non-plane-split architecture, the identifier may be of an eNB, a gNB, and so forth. Radio access network identifier field 355 may store other types of identifiers (e.g., a network slice identifier, a cell identifier, a sector identifier, etc.) and/or location information (e.g., tracking area code, tracking area identity, etc.) relating to access network 105 and end device 180.

MEC platform identifier field 360 may store an identifier of MEC device 117. For example, MEC platform identifier field 360 may store an identifier of a ME platform manager of MEC network 115, an identifier of MEC network 115, and/or an identifier of a ME platform or host device of MEC network 115.

Edge network exposure function identifier field 365 may store an identifier of edge network exposure function 125. End device identifier field 370 may store an identifier that identifies end device 180. For example, the identifier may be an International Mobile Subscriber Identity (IMSI), a Subscription Concealed Identifier (SUPI), a Radio Network Temporary Identifier (RNTI), a Cell-RNTI (C-RNTI), or other type of identifier of end device 180.

According to other exemplary implementations, table 350 may store additional, fewer, and/or different instances of edge network exposure function service information in support of the edge network exposure function service, as described herein. For example, the edge network exposure function service information may include other information pertaining to network topology, traffic profile information, information relating to an application service (e.g., type or category of application service, etc.), AMF identifiers, and/or other context information.

Referring back to FIG. 3A, edge network exposure function service logic 315 may use the edge network exposure function service information to support various services. For example, edge network exposure function service logic 315 may provide a control service relating to traffic steering, QoS control, and/or bandwidth control. Edge network exposure function service logic 315 may generate messages, interpret messages received via edge network exposure function interface 305 and MEC interface 310, and convert, filter, and/or translate messages in relation to the control service, and edge network exposure function 125 and/or MEC orchestrator 325 based on the edge network exposure function service information.

Edge network exposure function service logic 315 may provide a platform service that relates to an application service of MEC network 115. For example, edge network exposure function service logic 315 may generate, interpret, convert, filter, and/or translate messages in relation to the platform service, and edge network exposure function 125 and/or MEC orchestrator 325. By way of further example, the messages of the platform service may relate to adding, updating, deleting, instantiating, and/or other type of lifecycle aspect of an application service that may be associated with a MEC network 115 and MEC devices 117 (e.g., an ME platform manager, an ME platform and/or host device, etc.).

Edge network exposure function service logic 315 may provide a notification service. For example, edge network exposure function service logic 315 may generate messages, interpret, convert, filter, and/or translate messages in relation to the notification service, and edge network exposure function 125 and/or MEC orchestrator 325. By way of further example, the messages of the notification service may relate to location changes of end device 180 and/or mobility information. Other examples may include notifications pertaining to congestion or other types of performance degradations in the network.

Link 320 provides a communicative link between two or more components in which data may be communicated. Link 320 may be implemented as a hardware link (e.g., a bus, a shared memory space, etc.), a software link (e.g., inter-process communication (IPC), etc.) or some other type of communicative link (e.g., API, etc.).

Figure 4A:
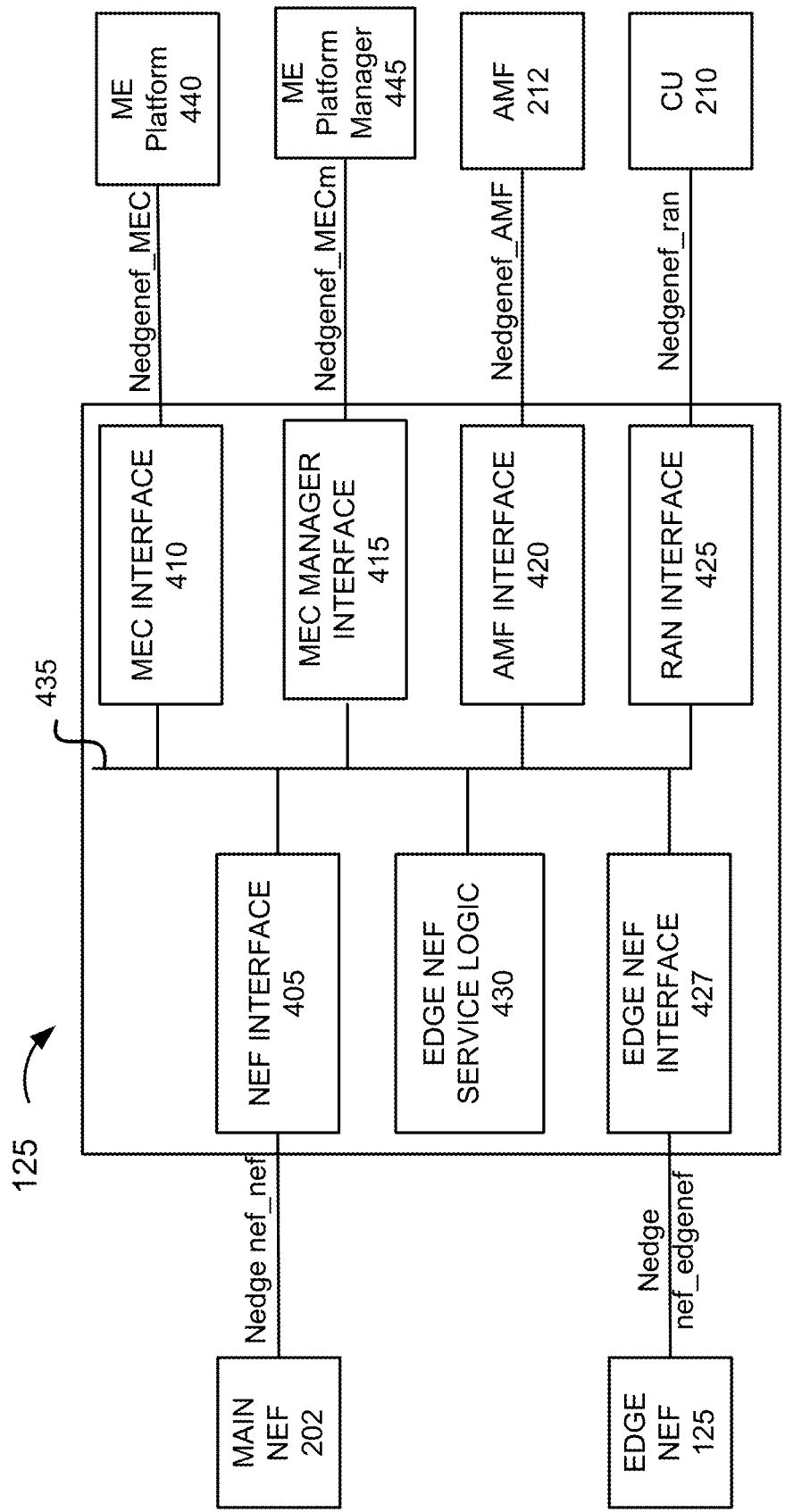
FIG. 4A is a diagram illustrating exemplary components of an edge network exposure function that provides an exemplary embodiment of the edge network exposure function service.

FIG. 4A is a diagram illustrating exemplary components of an exemplary embodiment of edge network exposure function 125. As illustrated, edge network exposure function 125 may include a NEF interface 405, a MEC interface 410, a MEC manager interface 415, an AMF interface 420, a RAN interface 425, edge network exposure function service information logic 430, and a link 435. According to other exemplary embodiments, edge network exposure function 125 may include additional, fewer, and/or different components that support the edge network exposure function service, as described herein. Multiple components may be combined into a single component. Additionally, or alternatively, a single component may be implemented as multiple components in which a process or a function may be collaboratively performed or multiple processes or functions may be split between them. According to various embodiments, one or more of the components may operate on various planes of an environment. For example, the various planes may include a data plane, a control plane, a management plane, and/or other planes implemented within the environment.

Edge network exposure function 125 may also include interfaces and logic in accordance with a standard (e.g., 3GPP, ITU, etc.) and/or a proprietary nature associated with a network exposure function (e.g., of a 5G or future generation core network). However, for the sake of brevity, such interfaces and logic have been omitted from this description.

NEF interface 405 may include an interface that provides communication with network exposure function 202 in support of the edge network edge function service. For purposes of description and reference, the interface is illustrated as an Nedgenef_nef interface.

MEC interface 410 may include an interface that provides communication with a MEC device 117, such as an ME platform 440 in support of the edge network exposure function service. For purposes of description and reference, the interface is illustrated as an Nedgenef_MEC interface.

MEC manager interface 415 may include an interface that provides communication with a MEC device 117, such as an ME platform manager 445 in support of the edge network exposure function service. For purposes of description and reference, the interface is illustrated as an Nedgenef_MECm interface.

AMF interface 420 may include an interface that provides communication with a core device 122, such as AMF 212 in support of the edge network exposure function service. For purposes of description and reference, the interface is illustrated as an Nedgenef_AMF interface. For example, edge network exposure function 125 may receive end device location, state, and/or status information relating to end device 180 from AMF 212.

RAN interface 425 may include an interface that provides communication with an access device 107, such as CU 210 in support of the edge network exposure function service. For purposes of description and reference, the interface is illustrated as an Nedgenef_ran interface. For example, edge network exposure function 125 may receive RAN information associated with an RNIS from access device 107. The RAN information may relate to radio network conditions, measurement information related to the user plane, information about end device 180, UE context and related radio bearers, and/or other radio network information that may be included in accordance with a standard (e.g., 3GPP) and/or of a proprietary nature. Edge network exposure function 125 may include a Radio Network Information (RNI) API that supports queries and subscriptions for RNI.

Edge NEF interface 427 may include an interface that provides communication with another edge network exposure function 125 in support of the edge network exposure function service. For purposes of description and reference, the interface is illustrated as an Nedgenef_edgenef interface. For example, edge network exposure function 125 may receive queries from another edge network exposure function 125, and provide end device context information for handover purposes, and so forth.

Figure 4B:
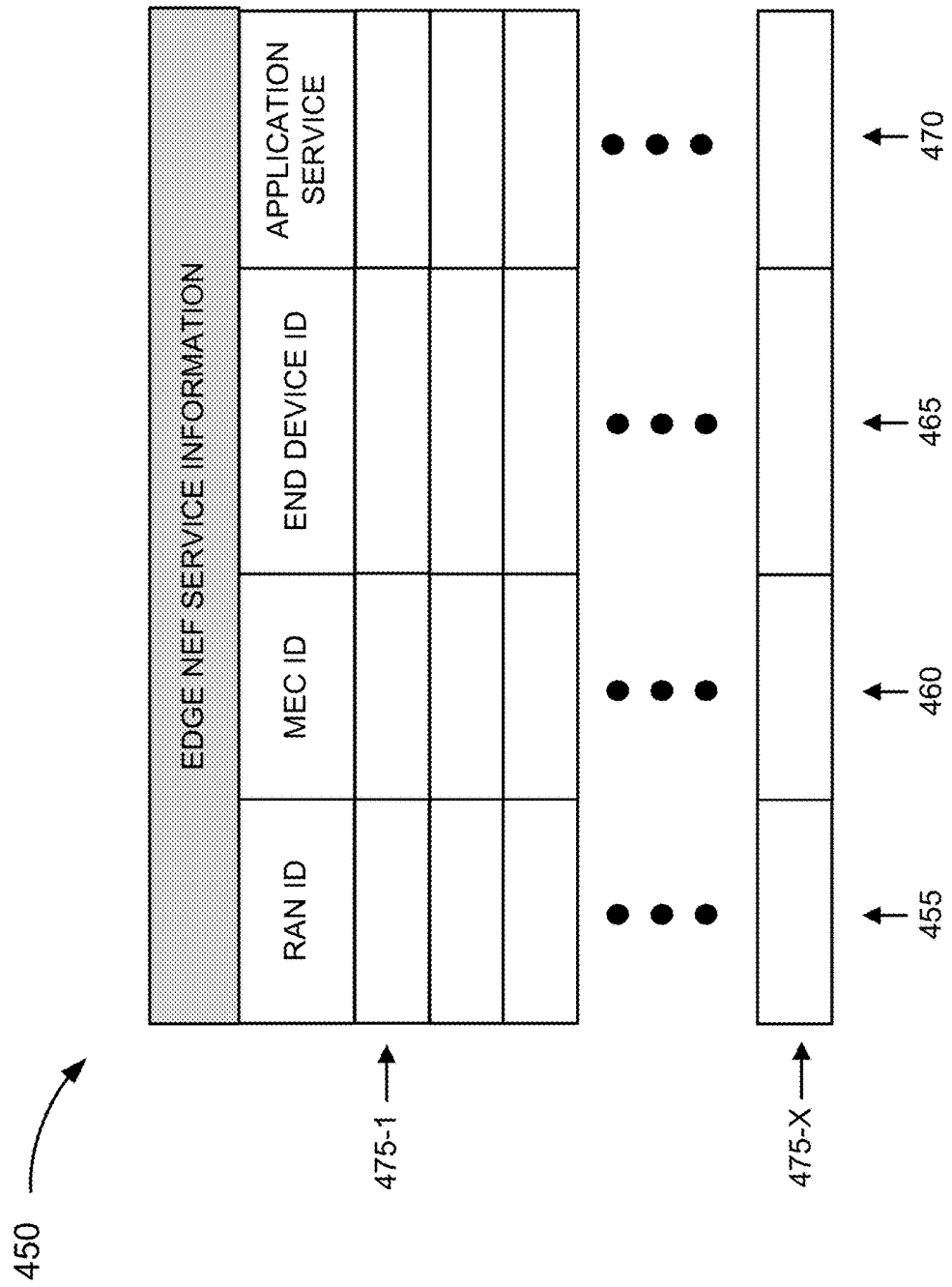
FIG. 4B is a diagram illustrating exemplary edge network exposure function service information.

Edge network exposure function service logic 430 may include logic that provides a MEC-edge network exposure function schema in support of the edge network exposure function service. For example, edge network exposure function service logic 430 may store edge network exposure function service information. FIG. 4B is a diagram illustrating exemplary edge network exposure function service information that may be stored in a table 450. As illustrated, table 450 may include a radio access network identifier field 455, a MEC identifier field 460, an end device identifier field 465, and an application service field 470. As further illustrated, table 450 includes records 475-1 through 475-X (also referred to as records 475, or individually or generally as record 475) that each includes a grouping of fields 455 through 470 (e.g., correlated information). Edge network exposure function service information is illustrated in tabular form merely for the sake of description. In this regard, edge network exposure function service information may be implemented in a data structure different from a table.

Radio access network identifier field 455 may store an identifier of access device 107 from which RAN information is received by edge network exposure function 125. Radio access network identifier field 455 may store an identifier of access device 107 that provides user plane data associated with an application service session between end device 180 and MEC network 115. For example, in a plane-split architecture, radio access network identifier field 355 may store identifiers of a CU and a DU. According to other examples, in a non-plane-split architecture, the identifier may be of an eNB, a gNB, and so forth. Radio access network identifier field 455 may store other types of identifiers (e.g., a network slice identifier, a cell identifier, a sector identifier, etc.) and/or location information (e.g., tracking area code, tracking area identity, etc.) relating to access network 105 and end device 180.

MEC platform identifier field 460 may store an identifier of MEC device 117. For example, MEC platform identifier field 460 may store an identifier of a ME platform manager of MEC network 115, an identifier of MEC network 115, and/or an identifier of a ME platform or host device of MEC network 115.

End device identifier field 465 may store an identifier that identifies end device 180. For example, the identifier may be an IMSI, a SUPI, an RNTI, a C-RNTI, or other type of identifier of end device 180.

Application service field 470 may store data relating to an application service associated with end device 180 and MEC network 115. For example, application service field 470 may store the type or category of the application service.

According to other exemplary implementations, table 450 may store additional, fewer, and/or different instances of edge network exposure function service information in support of the edge network exposure function service, as described herein. For example, the edge network exposure function service information may include other information pertaining to network topology, traffic profile information, AMF identifiers, UE context information, UE profile information, and/or other context information.

Referring back to FIG. 4A, edge network exposure function service logic 430 may use the edge network exposure function service information to support various services. For example, edge network exposure function service logic 430 may provide a control service relating to bandwidth control, end device information, end device QoE, RAN information, end device location information, and handover notification and procedure. Edge network exposure function service logic 430 may generate messages, interpret messages received via MEC interface 410 and RAN interface 425, and convert, filter, and/or translate messages in relation to the control service, and access device 107 (e.g. CU 210) and/or ME platform 440 based on the edge network exposure function service information.

Edge network exposure function service logic 430 may provide a platform service that relates to an application service of MEC network 115. For example, edge network exposure function service logic 430 may generate, interpret, convert, filter, and/or translate messages in relation to the platform service, and ME platform manager 445 and/or access device 107. By way of further example, the messages of the platform service may relate to adding, updating, deleting, instantiating, and/or other type of lifecycle or application service management aspect of an application service that may be associated with a MEC network 115 and MEC devices 117 (e.g., an ME platform manager, an ME platform and/or host device, etc.).

Edge network exposure function service logic 430 may provide a handover service. For example, edge network exposure function service logic 430 may query and transfer end device context information to a neighboring edge network exposure function 125 via edge NEF interface 427 when a handover occurs that impacts a MEC traffic flow. Additionally, edge NEF 125 may provide information to main NEF 202 to coordinate mobility between MEC network 115 and the macro network (e.g., access network 105, core network 120, etc.) including restricting services, which may only be applicable within the MEC network footprint.

Link 435 provides a communicative link between two or more components in which data may be communicated. Link 435 may be implemented as a hardware link (e.g., a bus, a shared memory space, etc.), a software link (e.g., inter-process communication (IPC), etc.) or some other type of communicative link (e.g., an application programming interface (API), etc.).

Figure 5:
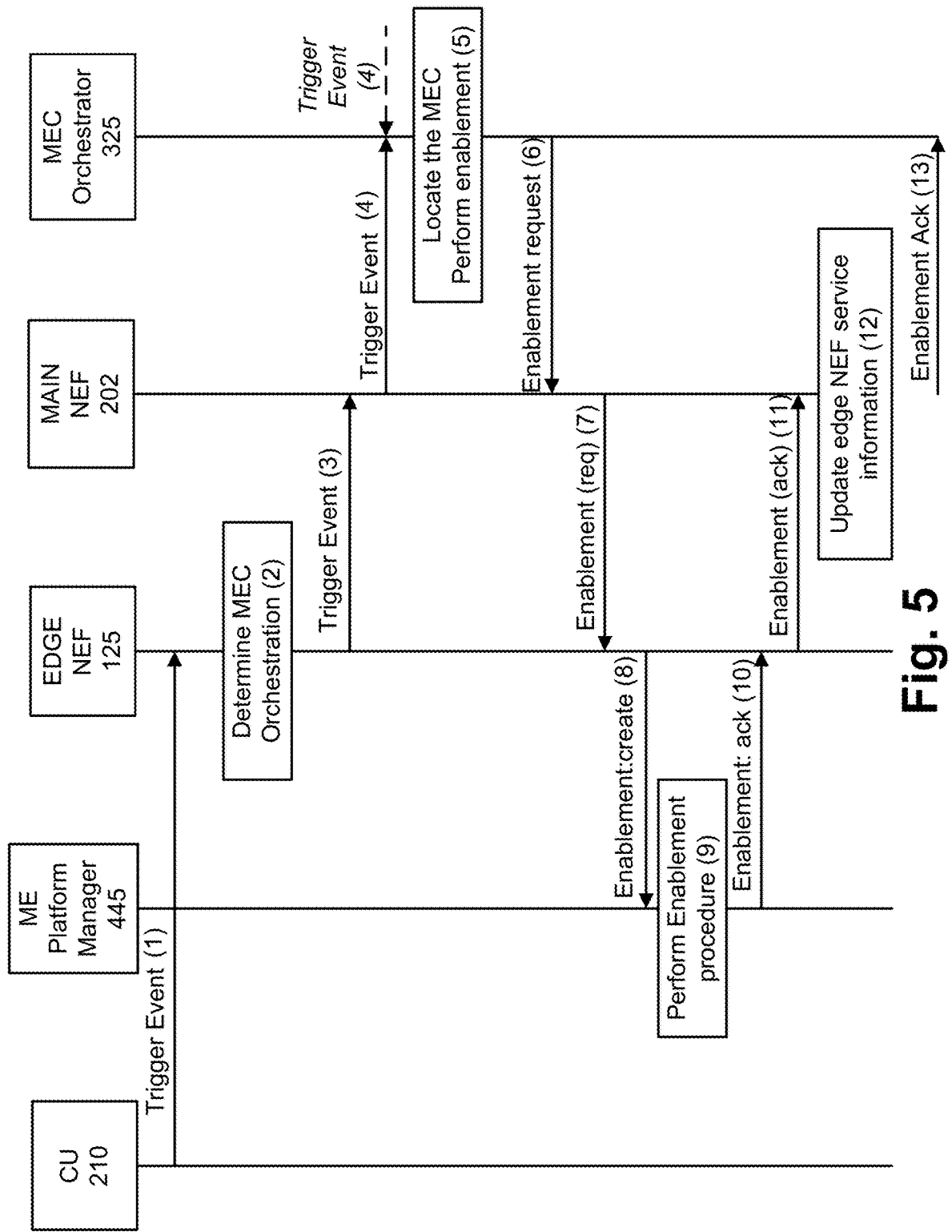
FIG. 5 is a diagram illustrating an exemplary process of an exemplary embodiment of the edge network exposure function service.

FIG. 5 is a diagram illustrating an exemplary process of an exemplary embodiment of the edge network exposure function service. The types of network devices are exemplary. For example, according to other exemplary processes, a different type of access device 107 (e.g., CU 210) and/or a different type of MEC device 117 (e.g., ME Platform manager 445) may be implemented. The messages described are exemplary, and the process may include additional or different messages.

Referring to FIG. 5, according to an exemplary scenario, end device 180 may have initially attached to access network 105, and transmits a request for an application service via access network 105, and the request is received by CU 210. According to another exemplary scenario, end device 180 may have an active application service session with MEC network 115, but end device 180 has changed location (e.g., moved to a new cell, etc.). Based on the change of location, CU 210 may receive a message.

According to either exemplary scenario, in step (1), CU 210 may transmit a message (e.g., illustrated as a trigger event in FIG. 5) to edge network exposure function 125. In step (2), edge network exposure function 125 may receive the message via RAN interface 425. Edge network exposure function 125 may interpret the message and determine that the message pertains to MEC orchestrator 325. Edge network exposure function 125 may convert and generate the message for transmission to main network exposure function 202. In step (3), edge network exposure function 125 may transmit the message to main network exposure function 202 via NEF interface 405. In step (4), main network exposure function 202 may receive the message via edge NEF interface 305, interpret the message, convert and generate a message for transmission to MEC orchestrator 325. Main network exposure function 202 may transmit the message to MEC orchestrator 325 via MEC interface 310.

In step (5), MEC orchestrator 325 may determine a MEC network 115 to provide an application service for end device 180. MEC orchestrator 325 may initiate an enablement procedure that may create the application service at the appropriate MEC network 115 based on the locale of end device 180. In step (6), MEC orchestrator 325 may generate and transmit a message (e.g., an enablement request as illustrated in FIG. 5) to main network exposure function 202. The enablement request may indicate a particular MEC network 115.

In step (7), main network exposure function 202 may receive the message via MEC interface 310. Main network exposure function 202 may interpret the message, convert and generate a message (e.g., enablement with various request parameters (req)). Main network exposure function 202 may use the edge network exposure function service information to select the edge network exposure function, and transmit the message to edge network exposure function 125 via edge NEF interface 305. In step (8), edge network exposure function 125 may receive the message and interpret the message. Edge network exposure function 125 may select ME platform manager 445 of the particular MEC network 115 to transmit a message based on the edge network exposure function service information. Edge network exposure function 125 may convert and generate a message (e.g., enablement with various creation parameters (create)), and transmit the message to ME platform manager 445 via MEC manager interface 415. In step (9), ME platform manager 445 may receive the message, and perform an enablement procedure. For example, ME platform manager 445 may cause ME platform 440 to create a virtual machine to provide the application service.

In steps (10) and (11), an acknowledgment or completion messages may be transmitted. In step (11), edge network exposure function 125 may update its edge network exposure function service information, and in step (12), main network exposure function 202 may also update its service information. In step (13), an acknowledgement or completion message may be transmitted to MEC orchestrator 325. According to other exemplary embodiments, MEC orchestrator 325 may receive a trigger event message from an administrator device (not illustrated), as illustrated in step (4).

Figure 6:
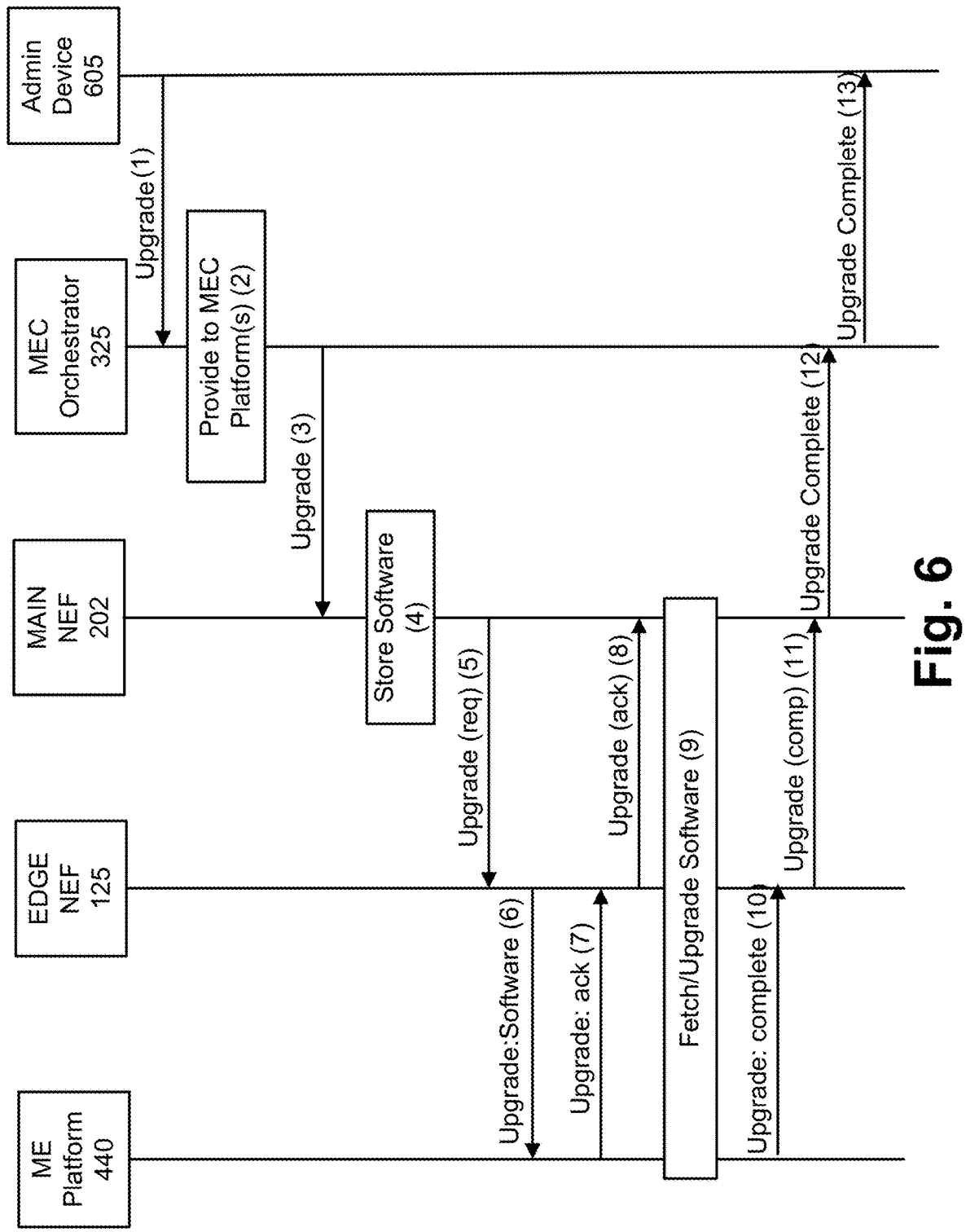
FIG. 6 is a diagram illustrating another exemplary process of an exemplary embodiment of the edge network exposure function service.

FIG. 6 is a diagram illustrating another exemplary process of an exemplary embodiment of the edge network exposure function service. The types of network devices are exemplary. For example, according to other exemplary processes, a different type of MEC device 117 (e.g., ME platform 440) may be implemented. The messages described are exemplary, and the process may include additional or different types of messages. The process includes an administrative device 605.

Referring to FIG. 6, in step (1), administrative device 605 may transmit a message to MEC orchestrator 325. The message may relate to upgrading software of MEC device 117 at MEC network 115. According to this exemplary scenario, the upgrade of the software relates to a host device (e.g., ME platform 440). In step (2), MEC orchestrator 325 may determine to which MEC device(s) 117 and MEC network(s) 115 the software upgrade pertains, and in step (3), transmit an upgrade message to main network exposure function 202. The upgrade message may include the upgraded software. In step (4), main network exposure function 202 may receive the message via MEC interface 310 Main network exposure function 202 may store the software, coordinate staging for the software upgrade, and select appropriate edge network exposure function 125 to facilitate the software upgrade, for example. In steps (5)-(8), messages may be transmitted vie edge network exposure function 125 to set-up a software upgrade procedure, and in step (9), ME platform 440 may obtain and upgrade the software. In steps (10)-(13), for example, a message (e.g., an upgrade completion) may be transmitted to administration device 605.

Figure 7:
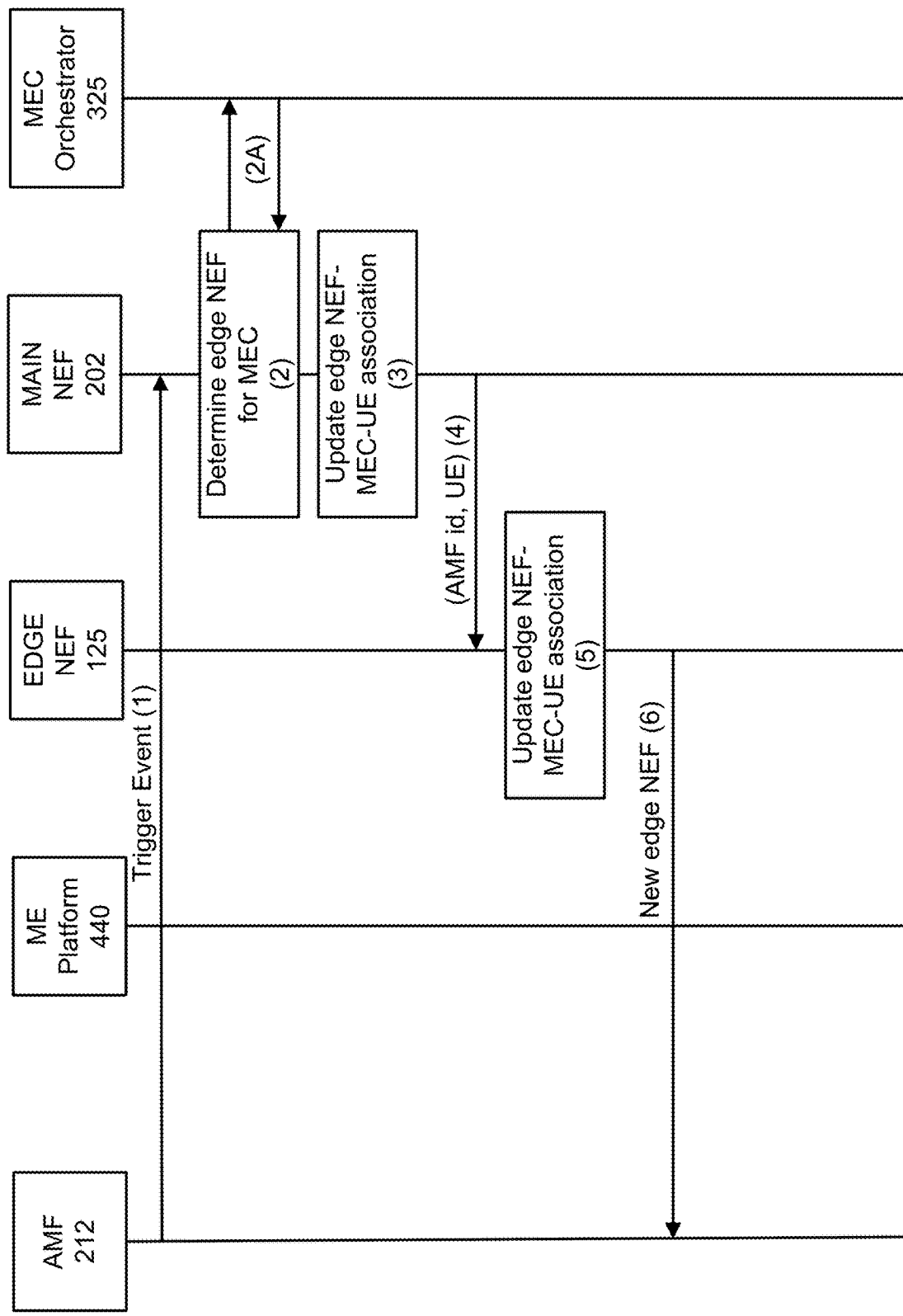
FIG. 7 is a diagram illustrating yet another exemplary process of an exemplary embodiment of the edge network exposure function service.

FIG. 7 is a diagram illustrating yet another exemplary process of an exemplary embodiment of the edge network exposure function service. The types of network devices are exemplary. For example, according to other exemplary processes, a different type of MEC device 117 (e.g., ME platform 440) may be implemented. The messages described are exemplary, and the process may include additional or different types of messages.

Referring to FIG. 7, AMF 212 may transmit a message (e.g., trigger event) to main network exposure function 202. The message may relate to a location of end device 180 (e.g., upon initial attachment) or a change of location (e.g., subsequent to attachment). Main network exposure function 202 may receive the message via AMF interface 420. Main network exposure function 202 may select an appropriate edge network exposure function 125 based on the location of end device 180. Main network exposure function 202 and MEC orchestrator 325 may exchange messages in relation to a change of location, as illustrated in step 2A.

In step (3), main network exposure function 202 may update the edge network exposure function service information based on the selection of the edge network exposure function 125. In this way, information indicating the edge NEF, MEC, and end device association may be stored. In step (4), main network exposure function 202 may transmit a message that includes an identifier of AMF 212 and an identifier of end device 180. In step (5), edge network exposure function 125 may update edge network exposure function service information based on the received message. In step (6), edge network exposure function 125 may transmit a message to AMF 212 indicating that edge network exposure function 125 relates to end device 180 and MEC network 115. According to some exemplary embodiments, AMF 212 may transmit subsequent location updates to edge network exposure function 125 versus main network exposure function 202.

Figure 8:
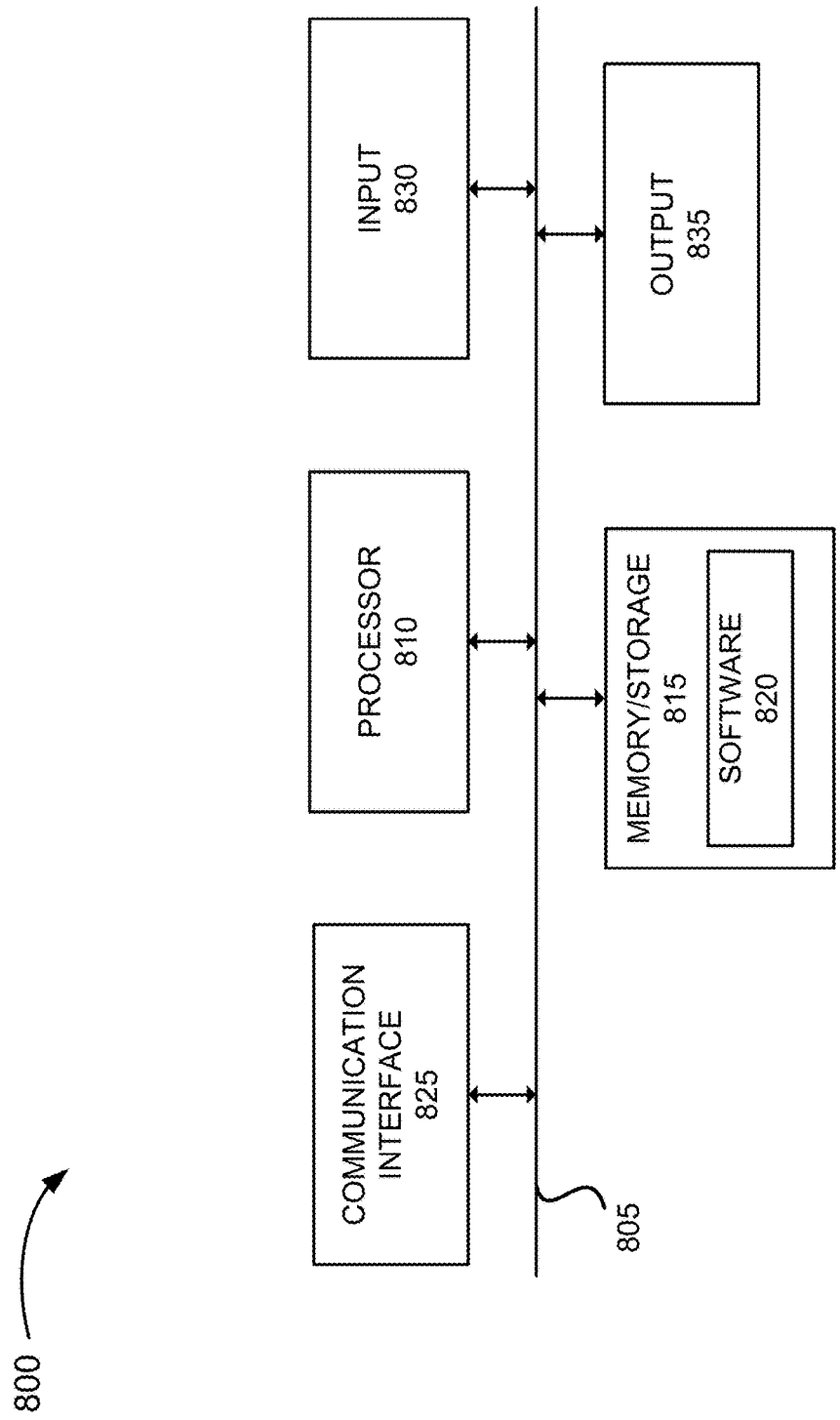
FIG. 8 is a diagram illustrating exemplary components of a device that may correspond to one or more of the devices illustrated and described herein.

FIG. 8 is a diagram illustrating exemplary components of a device 800 that may be included in one or more of the devices described herein. For example, device 800 may correspond to access device 107, MEC device 117, core device 122, edge network exposure function 125, end device 180, main network exposure function 202, CU 210, ME orchestrator 325, and/or other types of network devices, as described herein. As illustrated in FIG. 8, device 800 includes a bus 805, a processor 810, a memory/storage 815 that stores software 820, a communication interface 825, an input 830, and an output 835. According to other embodiments, device 800 may include fewer components, additional components, different components, and/or a different arrangement of components than those illustrated in FIG. 10 and described herein.

Bus 805 includes a path that permits communication among the components of device 800. For example, bus 805 may include a system bus, an address bus, a data bus, and/or a control bus. Bus 805 may also include bus drivers, bus arbiters, bus interfaces, clocks, and so forth.

Processor 810 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 810 may be implemented as hardware (e.g., a microprocessor, etc.), a combination of hardware and software (e.g., a SoC, an ASIC, etc.), may include one or multiple memories (e.g., cache, etc.), etc.

Processor 810 may control the overall operation or a portion of operation(s) performed by device 800. Processor 810 may perform one or multiple operations based on an operating system and/or various applications or computer programs (e.g., software 820). Processor 810 may access instructions from memory/storage 815, from other components of device 800, and/or from a source external to device 800 (e.g., a network, another device, etc.). Processor 810 may perform an operation and/or a process based on various techniques including, for example, multithreading, parallel processing, pipelining, interleaving, etc.

Memory/storage 815 includes one or multiple memories and/or one or multiple other types of storage mediums. For example, memory/storage 815 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 815 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 815 may include drives for reading from and writing to the storage medium.

Memory/storage 815 may be external to and/or removable from device 800, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 815 may store data, software, and/or instructions related to the operation of device 800.

Software 820 includes an application or a program that provides a function and/or a process. As an example, with reference to edge network exposure function 125 and main network exposure function 202, software 820 may include an application that, when executed by processor 810, provides a function of the edge network exposure function service, as described herein. Software 820 may also include firmware, middleware, microcode, hardware description language (HDL), and/or other form of instruction. Software 820 may also be virtualized. Software 820 may further include an operating system (OS) (e.g., Windows, Linux, Android, proprietary, etc.).

Communication interface 825 permits device 800 to communicate with other devices, networks, systems, and/or the like. Communication interface 825 includes one or multiple wireless interfaces and/or wired interfaces. For example, communication interface 825 may include one or multiple transmitters and receivers, or transceivers. Communication interface 825 may operate according to a protocol stack and a communication standard. Communication interface 825 may include an antenna. Communication interface 825 may include various processing logic or circuitry (e.g., multiplexing/de-multiplexing, filtering, amplifying, converting, error correction, application programming interface (API), etc.). Communication interface 825 may be implemented as a point-to-point interface, a service based interface, etc.

Input 830 permits an input into device 800. For example, input 830 may include a keyboard, a mouse, a display, a touchscreen, a touchless screen, a button, a switch, an input port, speech recognition logic, and/or some other type of visual, auditory, tactile, etc., input component. Output 835 permits an output from device 800. For example, output 835 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 800 may be implemented in the same manner. For example, device 800 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a MEC network 115 or another type of application service layer network.

Device 800 may perform a process and/or a function, as described herein, in response to processor 810 executing software 820 stored by memory/storage 815. By way of example, instructions may be read into memory/storage 815 from another memory/storage 815 (not shown) or read from another device (not shown) via communication interface 825. The instructions stored by memory/storage 815 cause processor 810 to perform a process described herein. Alternatively, for example, according to other implementations, device 800 performs a process described herein based on the execution of hardware (processor 810, etc.).

FIGS. 9-12 illustrate exemplary processes of exemplary embodiments of the edge network exposure function service. According to an exemplary embodiment, edge network exposure function 125 may perform steps of a process. According to an exemplary implementation, processor 810 executes software 820 to perform a step of a process, as described herein. Alternatively, a step may be performed by execution of only hardware.

Figure 9:
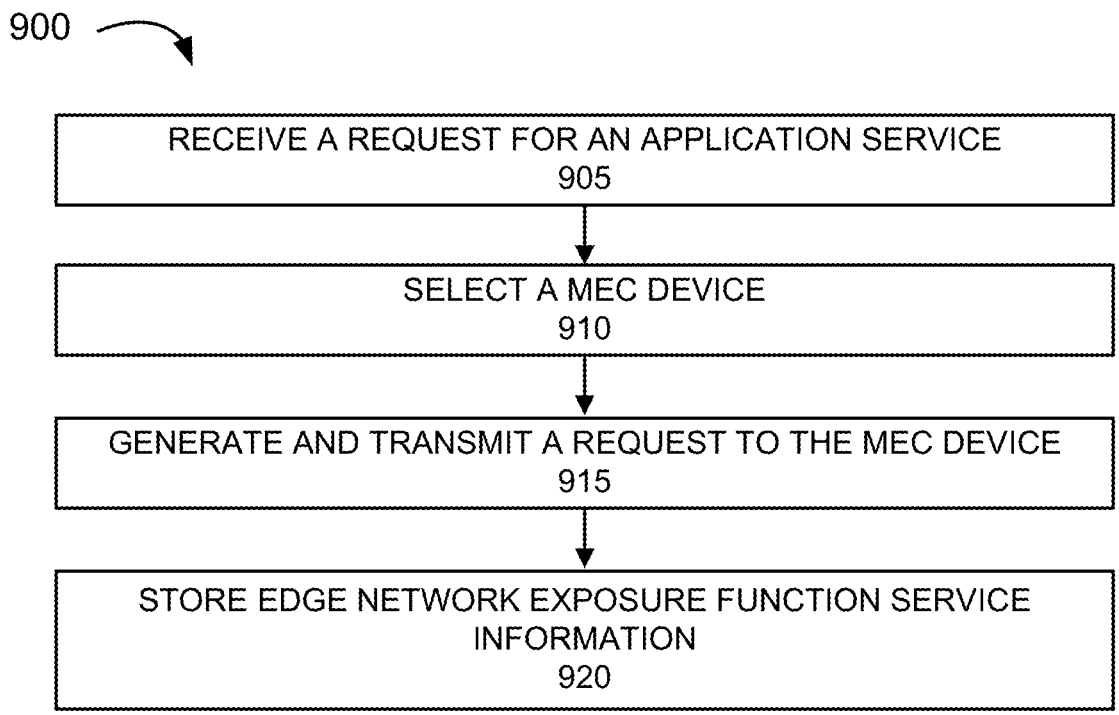
FIG. 9 is a flow diagram illustrating an exemplary process of an exemplary embodiment of the edge network exposure function service.

FIG. 9 is a flow diagram illustrating an exemplary process 900 of an exemplary embodiment of the edge network exposure function service. In block 905, edge network exposure function 125 may receive a request for an application service in relation to MEC network 115. For example, the request may be received from main network exposure function via NEF interface 405, which may be based on an enablement request from a MEC orchestrator. In block 910, edge network exposure function 125 may select a MEC device 117 of MEC network 115 to transmit the request. For example, edge network exposure function 125 may select an ME platform manager of MEC network 115 based on the type of request. In block 915, edge network exposure function 125 may generate and transmit a request to the selected MEC device 117. Edge network exposure function 125 may convert the request message for MEC consumption. For example, the request message may be to instantiate (e.g., create) a VM that provides the application service at a host device of MEC network 115. Edge network exposure function 125 may transmit the request message to MEC device 117 via MEC manager interface 415. In block 920, edge network exposure function 125 may store information that correlates edge network exposure function 125 with MEC 115 and end device 180, as previously described. According to other exemplary embodiments, the request may pertain to other lifecycle aspects of an application service (e.g., delete, suspend, etc.).

Figure 10:
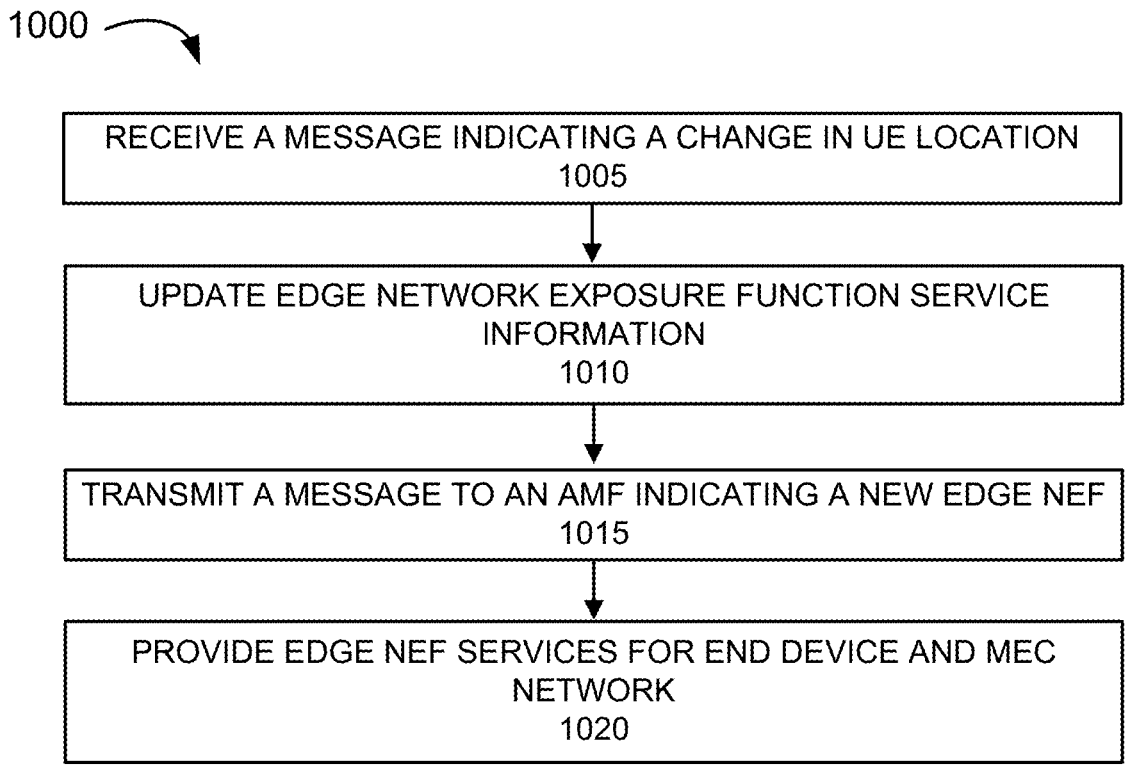
FIG. 10 is a flow diagram illustrating another exemplary process of an exemplary embodiment of the edge network exposure function service.

FIG. 10 is a flow diagram illustrating another exemplary process 1000 of another exemplary embodiment of the edge network exposure function service. In block 1005, edge network exposure function 125 may receive a message via NEF interface 405 from main network exposure function 202. For example, the message may include an end device identifier, an AMF identifier, and a MEC identifier. In block 1010, edge network exposure function 125 may update edge network exposure function service information based on the message. In block 1015, edge network exposure function may generate and transmit a message to AMF 212 associated with the AMF identifier via AMF interface 420. The message may indicate that edge network exposure function 125 is assigned to end device 180 associated with the end device identifier. In block 1020, edge network exposure function 125 may provide the edge network exposure function service for end device 180 and associated MEC network 115.

Figure 11:
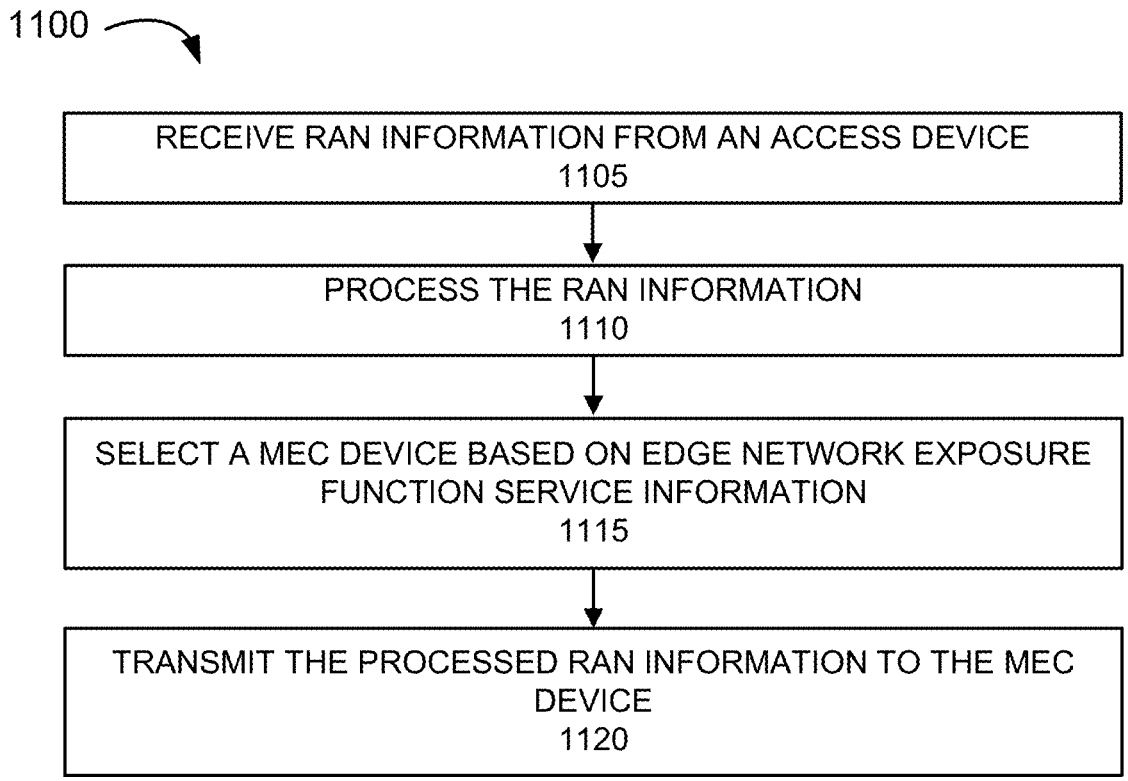
FIG. 11 is a flow diagram illustrating still another exemplary process of an exemplary embodiment of the edge network exposure function service.

FIG. 11 is a flow diagram illustrating still another exemplary process 1100 of another exemplary embodiment of the edge network exposure function service. In block 1105, edge network exposure function 125 may receive RAN information from access device 107 via RAN interface 425. For example, the RAN information may be associated with a RNIS. In block 1110, edge network exposure function 125 may process the RAN information. For example, edge network exposure function 125 may convert and/or aggregate the RAN information for consumption by MEC device 117 and/or filter the RAN information to prevent security exposure of certain RAN information. By way of further example, edge network exposure function 125 may remove one or more instances of the RAN information.

In block 1115, edge network exposure function 125 may select MEC device 117 to transmit the RAN information based on the edge network exposure function service information. In block 1120, edge network exposure function 125 may generate and transmit the RAN information to the selected MEC device 117 via MEC interface 410 or MEC manager interface 415. According to other exemplary embodiments, information different from the RAN information may be received and transmitted to MEC device 117, such as a UE profile, etc.

Figure 12:
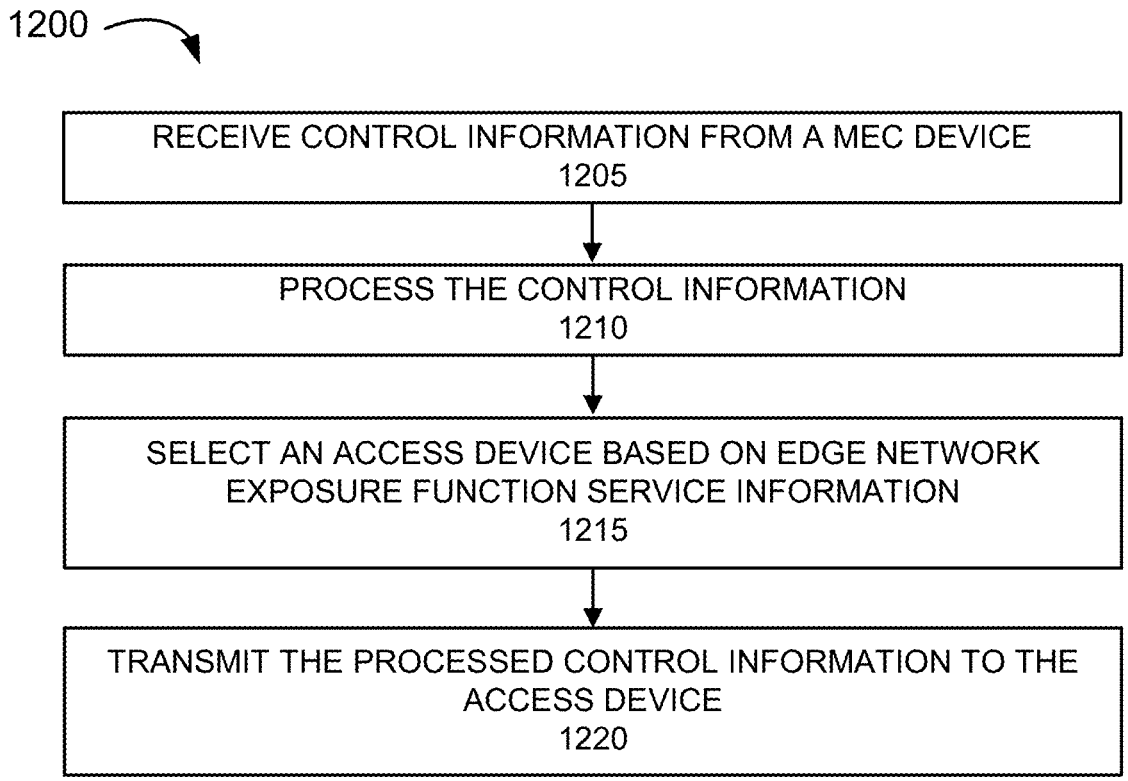
FIG. 12 is a flow diagram illustrating yet another exemplary process of an exemplary embodiment of the edge network exposure function service.

FIG. 12 is a flow diagram illustrating yet another exemplary process 1200 of another exemplary embodiment of the edge network exposure function service. In block 1205, edge network exposure function 125 may receive control information from MEC device 117 via MEC interface 410. For example, the control information may relate to bandwidth control, QoS parameters associated with a traffic flow, traffic shaping, a network slice, and/or another type of application service management information. In block 1210, edge network exposure function 125 may process the control information. For example, edge network exposure function 125 may convert the control information for consumption by access device 107. In block 1215, edge network exposure function 125 may select access device 107 to transmit the control information based on the edge network exposure function service information. In block 1220, edge network exposure function 125 may generate and transmit the control information to the selected access device 107 via RAN interface 425. According to other exemplary embodiments, information different from the control information may be received and transmitted to access device 107.

Figure 13:
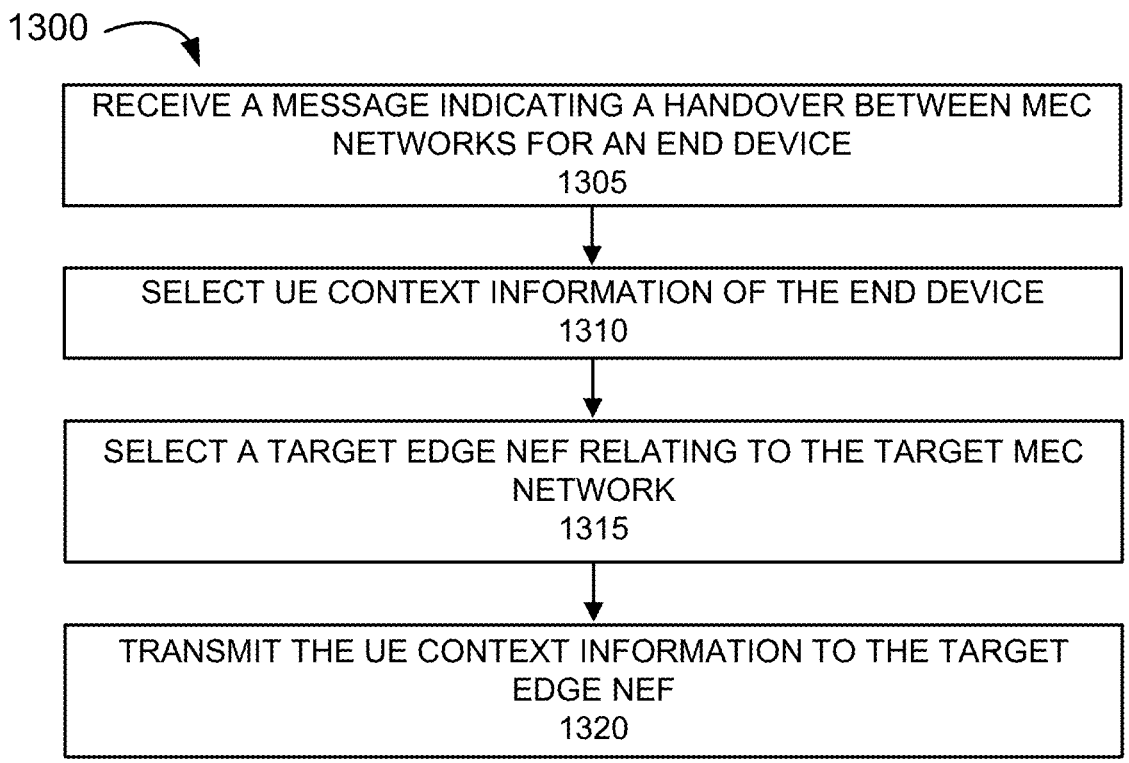
FIG. 13 is a flow diagram illustrating another exemplary process of an exemplary embodiment of the edge network exposure function service.

FIG. 13 is a flow diagram illustrating another exemplary process 1300 of another exemplary embodiment of the edge network exposure function service. In block 1305, edge network exposure function 125 may receive a message indicating a handover between MEC networks 115 and end device 180 via NEF interface 405. In block 1310, edge network exposure function 125 may interpret the message and select UE context information pertaining to end device 180. In block 1315, edge network exposure function 125 may select a target edge network exposure function 125 relating to the target MEC network associated with the handover to transmit the UE context information. For example, edge network exposure function 125 may store and perform a lookup of topology information and/or the received message may include an identifier of the target network exposure function 125. In block 1320, edge network exposure function 125 may generate and transmit the UE context information to the selected edge network exposure function 125 via edge NEF interface 427. According to other exemplary embodiments, information different from the UE context information may be transmitted to the target edge network exposure function 125.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 9-13, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 810, etc.), or a combination of hardware and software (e.g., software 820).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 810) of a device. A non-transitory storage medium includes one or more of the storage mediums described in relation to memory/storage 815. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    storing, by an edge network exposure function device, service information that includes correlations between portions of a radio access network and application service layer networks;
    receiving, by the edge network exposure function device from a radio access network device, radio access network information associated with one of the portions of the radio access network;
    converting, by the edge network exposure function device, the radio access network information including removing one or more instances of the radio access network information relating to at least one of privacy or security of a network operator;
    selecting, by the edge network exposure function device, a first application service layer network device of one of the application service layer networks based on the service information; and transmitting, by the edge network exposure function device to the first application service layer network device, the converted radio access network information.

2. The method of claim 1, wherein the service information further includes correlations with network topology and traffic profile information, and wherein the one or more instances of the radio access network information include proprietary information that relates to privacy and security of the network operator.

3. The method of claim 1, wherein the one of the application service layer networks is a multi-access edge computing (MEC) network.

4. The method of claim 1, wherein the first application service layer network device includes a multi-access edge platform manager.

5. The method of claim 1, further comprising:
storing, by the edge network exposure function device, end device context information pertaining to an end device and an application service session associated with the one of the application service layer networks;
receiving, by the edge network exposure function device from a main network exposure function device, a message indicating a handover for the end device to another one of the application service layer networks; and
transmitting, by the edge network exposure function device to another edge network exposure function device associated with the other one of the application service layer networks, the end device context information.

6. The method of claim 1, further comprising:
receiving, by the edge network exposure function device from a second application service layer network device of the one of the application service layer networks, control information pertaining to an end device and an application service session associated with the one of the application service layer networks;
converting, by the edge network exposure function device, the control information;
selecting, by the edge network exposure function device, the radio access network device based on the service information and the control information; and
transmitting, by the edge network exposure function device to the radio access network device, the converted control information.

7. The method of claim 1, further comprising:
receiving, by the edge network exposure function device from a main network exposure function device, a message that pertains to a lifecycle of an application service provided by the one of the application service layer networks;
selecting, by the edge network exposure function device, a second application service layer network device of the one of the application service layer networks based on the service information and the message; and
transmitting, by the edge network exposure function device to the second application service layer network device, the message.

8. The method of claim 7, wherein the message indicates to instantiate the application service.

9. An edge network exposure function device comprising:
a communication interface;
a processor, wherein the processor is configured to:
store service information that includes correlations between portions of a radio access network and application service layer networks;
receive, via the communication interface from a radio access network device, radio access network information associated with one of the portions of the radio access network;
convert the radio access network information including removing one or more instances of the radio access network information relating to at least one of privacy or security of a network operator;
select a first application service layer network device of one of the application service layer networks based on the service information; and
transmit, via the communication interface to the first application service layer network device, the converted radio access network information.

10. The edge network exposure function device of claim 9, wherein the service information further includes correlations with network topology and traffic profile information, and wherein the one or more instances of the radio access network information include proprietary information that relates to privacy and security of the network operator.

11. The edge network exposure function device of claim 9, wherein the one of the application service layer networks is a multi-access edge computing (MEC) network.

12. The edge network exposure function device of claim 9, wherein the first application service layer network device includes a multi-access edge platform manager.

13. The edge network exposure function device of claim 9, wherein the processor is further configured to:
store end device context information pertaining to an end device and an application service session associated with the one of the application service layer networks;
receive, via the communication interface from a main network exposure function device, a message indicating a handover for the end device to another one of the application service layer networks; and
transmit, via the communication interface to another edge network exposure function device associated with the other one of the application service layer networks, the end device context information.

14. The edge network exposure function device of claim 9, wherein the processor is further configured to:
receive, via the communication interface from a second application service layer network device of the one of the application service layer networks, control information pertaining to an end device and an application service session associated with the one of the application service layer networks;
convert the control information;
select the radio access network device based on the service information and the control information; and
transmit, via the communication interface to the radio access network device, the converted control information.

15. The edge network exposure function device of claim 14, the processor is further configured to:
receive, via the communication interface from a main network exposure function device, a message that pertains to a lifecycle of an application service provided by the one of the application service layer networks;
select a second application service layer network device of the one of the application service layer networks based on the service information and the message; and
transmit, via the communication interface to the second application service layer network device, the message.

16. The edge network exposure function device of claim 15, wherein the message indicates to instantiate the application service.

17. A non-transitory computer-readable storage medium storing instructions executable by a processor of an edge network exposure function device, which when executed cause the edge network exposure function device to:
- store service information that includes correlations between portions of a radio access network and application service layer networks;
- receive, from a radio access network device, radio access network information associated with one of the portions of the radio access network;
- convert the radio access network information including removing one or more instances of the radio access network information relating to at least one of privacy or security of a network operator;
- select a first application service layer network device of one of the application service layer networks based on the service information; and
- transmit, to the first application service layer network device, the converted radio access network information.

18. The non-transitory computer-readable storage medium of claim 17, wherein the service information further includes correlations with network topology and traffic profile information, and wherein the one or more instances of the radio access network information include proprietary information that relates to privacy and security of the network operator.

19. The non-transitory computer-readable storage medium of claim 17, wherein the instructions further comprise instructions, which when executed by the processor further cause the edge network exposure function device to:
- store end device context information pertaining to an end device and an application service session associated with the one of the application service layer networks;
- receive, from a main network exposure function device, a message indicating a handover for the end device to another one of the application service layer networks; and
- transmit, to another edge network exposure function device associated with the other one of the application service layer networks, the end device context information.

20. The non-transitory computer-readable storage medium of claim 17, wherein the one of the application service layer networks is a multi-access edge computing (MEC) network, and wherein the first application service layer network device includes a multi-access edge platform manager.

* * * * *